UNITED STATES PATENT OFFICE.

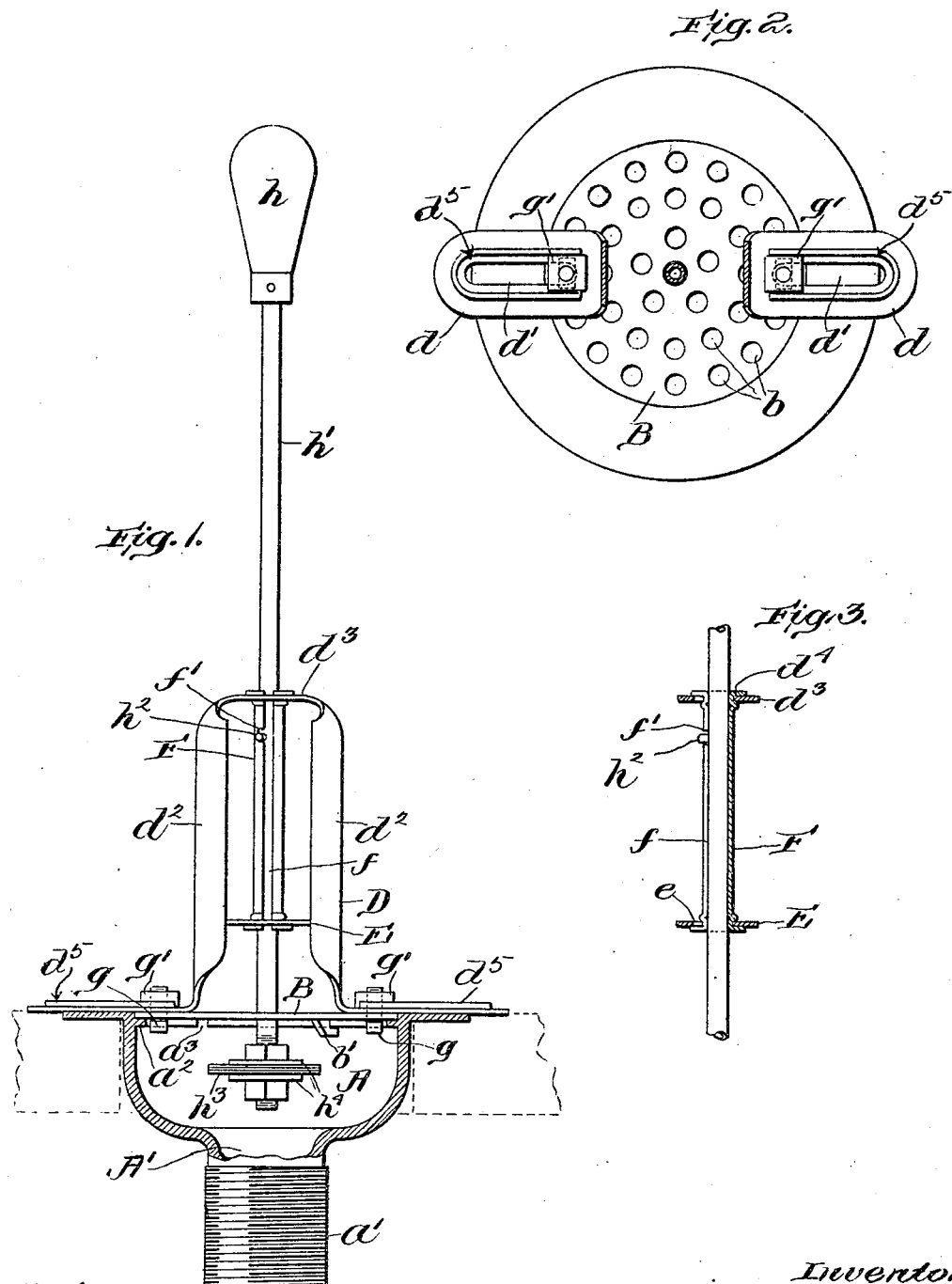

WILLIAM P. DUNN, OF BOSTON, MASSACHUSETTS, ASSIGNOR OF ONE-HALF TO ANNIE M. FITZGERALD, OF BOSTON, MASSACHUSETTS.

DEVICE FOR SINKS.

No. 801,445.     Specification of Letters Patent.     Patented Oct. 10, 1905.

Application filed February 23, 1905. Serial No. 246,920.

*To all whom it may concern:*

Be it known that I, WILLIAM P. DUNN, of Boston, in the county of Suffolk and State of Massachusetts, have invented a new and useful Device for Sinks and the Like, of which the following is a specification.

The object of my invention is to provide means for holding water in sinks and for cleaning the waste-pipe; and my invention consists in the combination of a bowl with an orifice, a strainer attached to the bowl, a frame supported by the strainer, and a rod mounted in the frame and carrying a valve to close the orifice in the bowl.

In the accompanying drawings, Figure 1 is an elevation of my device, partly in section. Fig. 2 is a top plan with the upper part of the frame and rod removed. Fig. 3 is a view showing a portion of the rod and showing the sleeve in section.

The sink (shown in dotted lines) receives bowl A, which has orifice A' and outlet-pipe $a'$, threaded for connection with the pipe leading to the trap, and ring $a^2$, projecting inwardly from its inner surface. Ring $a^2$ has a slot at $a^3$. Strainer B is perforated at $b\,b$ and has hooks $b'\,b'$. Guiding-frame D is preferably made in a single piece with base portions $d\,d$ slotted at $d'\,d'$ and with uprights $d^2\,d^2$ and upper bearing portion $d^3$, perforated at $d^4$. Plate E, perforated at $e$, is attached to uprights $d^2\,d^2$. The base portions $d\,d$ have raised projections $d^5\,d^5$. Sleeve F is attached to portion $d^3$ and to plate E and has passage $f$ and notch $f'$. The guiding-frame is held in position by bolts and nuts, the heads $g\,g$ of the bolts being preferably oblong and nuts $g'\,g'$ being substantially rectangular. Handle $h$ is attached to rod $h'$, which has tooth $h^2$ and is threaded at its lower end and carries valve or piston $h^3$, which is preferably a rubber ring held in place by expanded nuts $h^4\,h^4$.

In using my device the strainer is held to the bowl by the engagement of hooks $b'\,b'$ with ring $a^2$. The frame is held in position by the nuts and bolts, the nuts being rectangular to fit within projections $d^5\,d^5$, which prevent turning of the nuts. The bolt-heads are oblong for the purpose of passing freely by ring $a^2$.

The base portions of the frame are extended for two purposes—namely, to act as a firm foundation and so prevent tilting of the frame and also to allow the frame to be used with different-sized strainers—that is, the bolts may be adjusted in the slots to hold the frame to a strainer of the desired diameter.

When the rod is in its raised position, water, &c., may pass freely through the bowl; but when the rod is lowered the valve stops up the mouth of the outlet-pipe and holds water in the sink for the purpose, for example, of soaking dishes in the sink in hot water.

Another important use of my device is to clean out matter which may have collected below the bowl, and this is accomplished by forcing the piston up and down in the outlet-pipe, with the result that a pump effect is had which forces out the collected matter.

Another function of my valve is to prevent gases rising from the waste-pipe, and this is accomplished by the valve when it closes the orifice of the bowl.

What I claim as my invention is—

The device above described comprising a bowl with an orifice; a strainer attached to the bowl; a frame supported by the strainer; and a rod mounted in the frame and carrying a valve to close the orifice in the bowl.

WILLIAM P. DUNN.

Witnesses:
   G. A. ROCKWELL,
   C. B. MAYNADIER.